United States Patent [19]

Iannello

[11] Patent Number: 5,696,412

[45] Date of Patent: Dec. 9, 1997

[54] SENSOR-LESS POSITION DETECTOR FOR AN ACTIVE MAGNETIC BEARING

[76] Inventor: Victor Iannello, 2623 Bobwhite Dr., Roanoke, Va. 21018

[21] Appl. No.: 138,217

[22] Filed: Oct. 20, 1993

[51] Int. Cl.[6] .................................................. H02K 7/09
[52] U.S. Cl. .................................................. 310/90.5
[58] Field of Search ........................ 310/90.5; 388/809, 388/814, 815, 821, 820

[56] References Cited

U.S. PATENT DOCUMENTS

| | | | |
|---|---|---|---|
| 4,245,869 | 1/1981 | Scheffer et al. | 308/10 |
| 4,308,490 | 12/1981 | Habermann | 318/632 |
| 4,387,935 | 6/1983 | Studer . | |
| 4,392,693 | 7/1983 | Habemann | 310/90.5 |
| 4,500,142 | 2/1985 | Brunet . | |
| 4,623,202 | 11/1986 | Shingu | 310/90.5 |
| 4,652,820 | 3/1987 | Maresca . | |
| 4,876,491 | 10/1989 | Squires et al. . | |
| 5,019,756 | 5/1991 | Schwarz . | |
| 5,047,715 | 9/1991 | Morgenstern . | |
| 5,053,662 | 10/1991 | Richter . | |
| 5,064,205 | 11/1991 | Hitfowrd . | |
| 5,111,102 | 5/1992 | Meeks . | |
| 5,126,610 | 6/1992 | Fremerey | 310/90.5 |
| 5,153,475 | 10/1992 | McSparran | 310/254 |
| 5,159,246 | 10/1992 | Ueki . | |
| 5,179,308 | 1/1993 | Malsky | 310/90.5 |
| 5,187,434 | 2/1993 | Ando . | |
| 5,193,568 | 3/1993 | Eissenberg et al. . | |
| 5,194,805 | 3/1993 | Nakajima . | |
| 5,214,378 | 5/1993 | Hore . | |
| 5,216,308 | 6/1993 | Meeks . | |
| 5,227,948 | 7/1993 | Boon | 310/90.5 |
| 5,237,229 | 8/1993 | Ohishi . | |
| 5,250,865 | 10/1993 | Meeks | 310/90.5 |
| 5,262,692 | 11/1993 | Williams | 310/90.5 |
| 5,287,031 | 2/1994 | Akiba et al. | 310/90.5 |
| 5,300,841 | 4/1994 | Preston et al. | 310/90.5 |
| 5,300,842 | 4/1994 | Lyons et al. | 310/90.5 |

(List continued on next page.)

FOREIGN PATENT DOCUMENTS 2581-462-A 5/1985 France .

OTHER PUBLICATIONS

Mizuno et al. (Literature Reference) Technomic, Landcaster, PA; (no month) 1992.
Okada et al. (Literature Reference) Technomic, Landcaster, PA; (no month) 1992.

Primary Examiner—Steven L. Stephen
Assistant Examiner—Jonathon Link
Attorney, Agent, or Firm—Robert E. Bushnell, Esq.

[57] ABSTRACT

A sensorless active magnetic bearing suitable for use in rotating machinery and seals, contemplates a circuit and a process for actively controlling the position of an object using magnetic forces without mechanical contact between the object suspended 10 and the components of the magnetic positioner, and without the necessity for discrete sensors for determining the position of the object suspended. Electromagnets $L_1$ and $L_2$ are placed in an ordered coaxial array surrounding an object to be suspended, and impart magnetic forces while simultaneously detecting the position of the object in accurate registration with the position of the corresponding electromagnets. In one embodiment constructed according the principles of the present invention, the currents to the electromagnets are controlled by switching amplifiers 20 that switch the amplitudes of the supply voltages applied across the coils of electromagnets $L_1$, $L_2$. When two or more electromagnets are placed electrically in series, the absolute magnitude of the voltage developed across a coil indicates its relative inductance. The position of the member along an axis may be detected by comparing the absolute magnitude of the voltage drops of the two electromagnets located on either side of the member being supported and along that axis because the inductance of the electromagnet varies with its distance from the supported member. In another embodiment constructed according these principles, a single electromagnet $L_1$ is placed electrically in series with a reference coil $L_{ref}$ and the absolute magnitude of the voltage across the reference coil may be used to detect the position of the member being supported.

32 Claims, 5 Drawing Sheets

U.S. PATENT DOCUMENTS

| | | | |
|---|---|---|---|
| 5,304,876 | 4/1994 | Lemarquand et al. | 310/90.5 |
| 5,315,197 | 5/1994 | Meeks et al. | 310/90.5 |
| 5,317,226 | 5/1994 | New | 310/90.5 |
| 5,319,273 | 6/1994 | Hockney et al. | 310/90.5 |
| 5,384,007 | 1/1995 | Hartel et al. | 57/76 |
| 5,386,166 | 1/1995 | Reimer et al. | 310/90.5 |
| 5,455,472 | 10/1995 | Weiss et al. | 310/90.5 |

SENSOR-LESS POSITION DETECTOR FOR AN ACTIVE MAGNETIC BEARING

BACKGROUND OF THE INVENTION

1. Technical Field

The present invention pertains to active magnetic positioning systems generally and more specifically, to magnetic servo-positioning systems using a control feedback loop without dedicated position sensors.

2. Background Art

Active magnetic bearings (see, for example, *Linear Magnetic Bearing*, U.S. Pat. No. 4,387,935 by Philip A. Studer and *Magnetic Bearing And Motor*, U.S. Pat. No. 4,381,875 by Philip A. Studer) have been used in an increasing number of applications as magnetic bearings supporting a body such as a rotating shaft, and as other servo-positioners. These applications depend upon the magnetic bearing system to control magnetic fields in and around the body being supported.

With active magnetic bearings, the body may be supported without mechanical contact. Consequently, there is no mechanical wear, frictional losses are small, and the necessity for lubricants is eliminated. Reduced maintenance requirements and extended life of the bearings can concomitantly reduce the overall life-cycle cost of the host machine while enabling the design and use of rotating equipment to operate in hostile environments such as in extremely low or very high temperatures, in a vacuum and in corrosive media. Magnetic bearings are therefore particularly suited for use in pumps, compressors, turbines, motors, fans, turbo-expanders and in spindles. Often, magnetic bearings permit operation at rotational speeds higher than would otherwise be practical using conventional mechanical bearings.

Active magnetic positioning may in my opinion, also be used in other applications, regardless of whether such other applications provide complete magnetic suspension of a body. For instance, a diaphragm may be magnetically positioned in a continuous and cyclical manner to effect compression or expansion of a working fluid. In another application, magnetic forces may be used to precisely position a rotating member relative to a stationary member so that a compartment may be scaled. A clearance seal so designed, would eliminate the need for sealing fluids such as oil, as well as the wear associated with packing and mechanical seals. Unlike a dry gas seal that relies upon hydrodynamic gas forces to position sealing surfaces, the performance of the seal would be independent of gas properties such as density, viscosity and moisture content, and would consequently perform relatively independently of the speed of the rotating member.

Although the advantages of active magnetic positioning are numerous, the systems are encumbered by the need for a sensing system to detect the position of the member. See, for example, the radial position sensors required by the *Magnetic Bearing Structure* by C. R. Meeks mentioned in U.S. Pat. No. 5,111,102 and the *Magnetic Bearing Structure Providing Radial, Axial And Moment Load Bearing Support For A Rotatable Shaft* also by C. R. Meeks in U.S. Pat. No. 5,216,308. For each axis of the member sought to be actively controlled, in contemporary designs of positioning systems at least one sensor is required to complete the feedback positioning control loop. These sensors and their associated circuitry increase the size, weight, cost and complexity of the magnetic positioner. This, I have noticed, is especially true if the member that is to be positioned is flexible (e.g., a rotating shaft) so that some of the structural bending modes become de-stabilized due to the non-collocation of the sensor and actuator. In U.S. Pat. No. 5,111,102, Crawford R. Meeks describes a *Magnetic Bearing Structure* with the structure arranged to provide a constant magnetic flux that is axially polarized and provided by either permanent magnets or electromagnetic coils superimposed with a variable flux that is radially polarized. Separate position sensors are needed to provide input to the servo control circuit. These sensors are not collocated with the electromagnets however.

Okada, et al., in *Sensor-Less Magnetic Levitation Control By Measuring The PWM Carrier Frequency Component* published in the *Proceedings of the 3rd International Symposium On Magnetic Bearings*, Technomic, Lancaster, Pa. (1992), describes a sensorless magnetic positioner with the carrier frequency component of the current supplied by a switching amplifier used to detect the position of a magnetically supported member. This approach requires the use of resonant circuits and active filters, and could only be made stable under a limited range of conditions. Moreover, the filters required reduce the bandwidth of the detection system and thereby degrade the stability of the servo loop. I have observed however, that bandwidth is critical for magnetic bearing applications because stability results from electronic phase lead (that is, by damping) introduced by the control circuitry. Consequently, this system has limited usefulness in many applications.

Mizuno, et al., in his paper titled *Towards Practical Applications Of Self-sensing Magnetic Bearings*, published in the *Proceedings of the 3rd International Symposium On Magnetic Bearings*, Technomic, Landcaster, Pa. (1992), describes a sensorless magnetic bearing with a space-state model of the shaft bearing system used to eliminate displacement and velocity of the supported shaft. Voltages occurring across the electromagnets are controlled and the resulting currents are measured in order to estimate the shaft's position using the space-state model. It seems to me therefore, that this bearing's performance is limited by the accuracy of the space-state representation of the actual plant, because the position of the shaft is only estimated. I note that in many practical applications such as high-speed, flexible shafts, an accurate plant model is difficult to obtain and is computationally intensive. Mizuno reported that when compared to conventional magnetic bearings using sensors, it was more difficult using the self-sensing magnetic bearings to adjust the controller in order to obtain adequate performance, due to the increased complexity of the controller for the self-sensing bearings.

SUMMARY OF THE INVENTION

It is therefore, an object of the present invention to provide an improved magnetic bearing system.

It is another object to provide an active magnetic bearing system that eliminates a need for a dedicated position sensor.

It is yet another object to provide an active magnetic bearing system using a closed feedback loop having no dedicated position sensor.

It is still another object to provide an active magnetic bearing system with collocated position sensing.

It is still yet another object to provide a more compact active magnetic bearing system.

It is a further object to provide an active magnetic bearing system exhibiting enhanced controllability.

It is a still further object to provide an active magnetic bearing system requiring a reduced degree of tuning.

It is a yet further object to provide a more compact active magnetic positioning device.

It is a still yet further object to provide an active magnetic positioning device operating with a reduced number of electrical conductors.

It is also an object to provide a less complex, and more reliable active magnetic bearing system.

It is a further object to provide an electromagnetic positioning system that effectively enables sensing of the position of a mass being supported by an electromagnet at a location coinciding with the precise location of the electromagnet.

These and other objects may be achieved in accordance with one aspect of the present invention, with a circuit and a process for actively controlling the position of an object using magnetic forces without mechanical contact. Electromagnets are placed in an ordered array surrounding an object to be suspended, to impart magnetic forces toward the object while simultaneously detecting the position of the object in accurate registration with the position of the corresponding electromagnets. In one embodiment constructed according the principles of the present invention, the currents through the electromagnets are controlled by switching amplifiers that switch the supply amplitudes of the voltages applied across the coils. With two or more electromagnets coupled electrically in series, the absolute magnitude of the voltage developed across each coil indicates its relative inductance. The position of the object being supported along an axis may be detected by comparing the absolute magnitude of the voltage drops across the two electromagnets located on either side of the member and along that axis, because the inductance of the electromagnet varies with its distance from the supported member.

In another embodiment constructed according these principles, a single electromagnet is placed electrically in series with a reference coil and the absolute magnitude of the voltage across the reference coil may be used to detect the position of the member being supported.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Referring now to the drawings, the several figures show configurations using complementary arrangements of electromagnets and independently controlled electromagnets. In the following description, coils are shown along a single axis. It should be understood however, that generally it would be desirable in the practice of the foregoing principles to provide stability by restraining five degrees of shaft freedom. These are the radial dislocation of the shaft with respect to mutually orthogonal X and Y axes, tilting of the shaft with respect to either of the X or Y axes, and axial shifting of the shaft along its longitudinal axis.

Configuration for Bearing with Complementing Electromagnets

Figure 1:
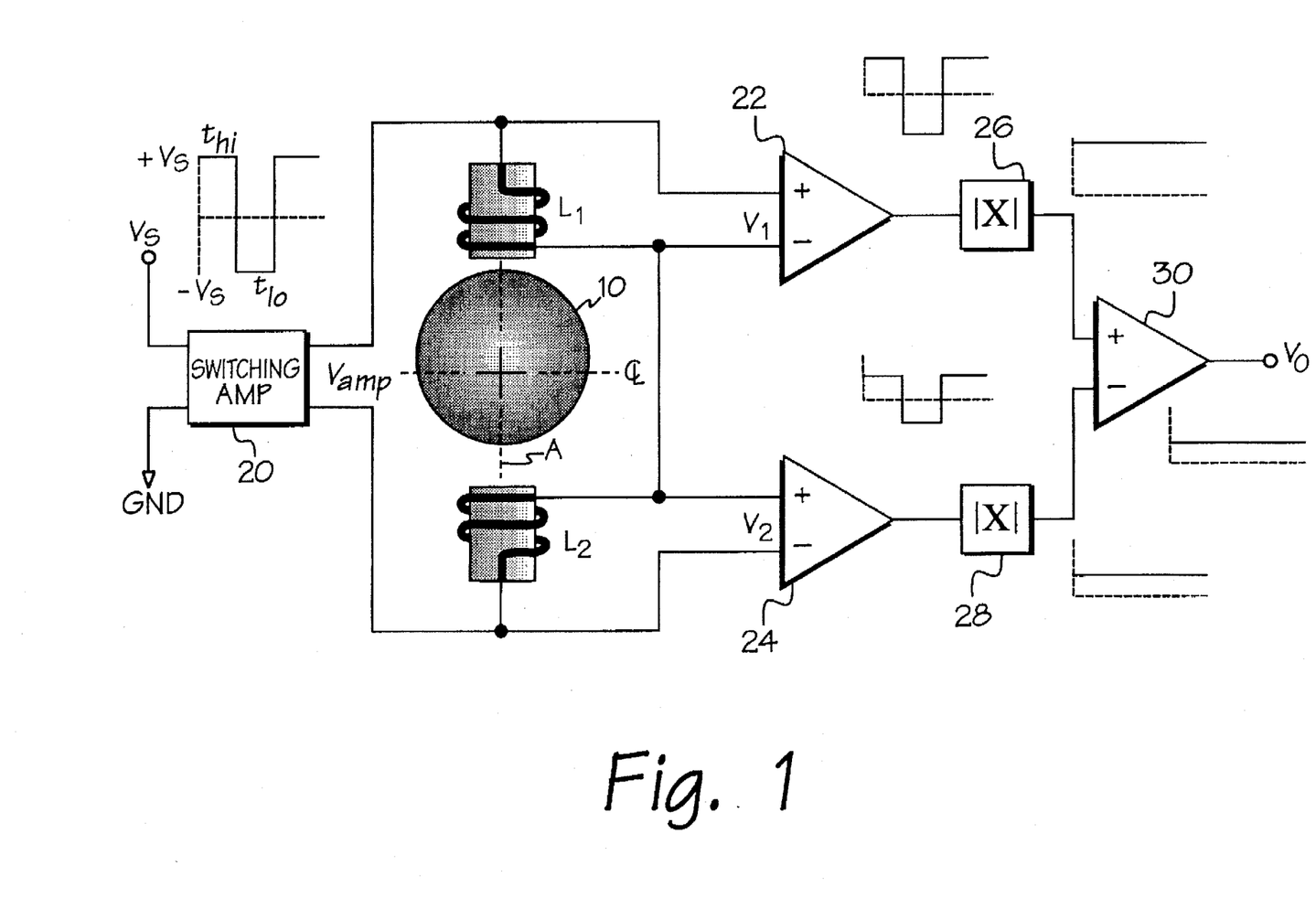
FIG. 1 is a block diagram illustrating implementation of one embodiment providing sensorless detection of shaft position, constructed according to the principles of the present invention with complementary coils.

Turning now to FIG. 1, one scheme for implementing sensor-less detection for a magnetic bearing configuration is shown in a circuit in which "bias flux" is provided from electromagnets or permanent magnets (not shown) separate from positioning magnets L1, L2. The structure and circuit for producing bias flux is not shown. The electromagnets L1, L2 are co-incident along a coaxial axis "A" radially extending through a mass of a ferromagnetic material such as a steel shaft 10, to impart forces in opposite directions across this axis. Electromagnets L1, L2 are electrically connected in series across the outlet ports of switching amplifier 20. As such, the single amplifier 20 supplies a pulse modulated current to both electromagnets L1, L2. The opposing coils of electromagnets L1, L2 are driven by a bi-directional (i.e., forward and reverse) current provided through the output ports of switching amplifier 20. Electromagnets L1, L2 are connected such that for a given current direction, the currents through the coil windings of electromagnets L1, L2 induce a magnetic field which adds to the bias flux in one electromagnet and subtracts from the magnetic field in the other electromagnet. In this way, only a single amplifier is needed to impart forces in both directions along axis A. The non-inverting input port (+) of operational amplifier 22 is coupled with one side of the coil of electromagnet $L_1$ to one of the two output ports of amplifier 20, while the inverting port (−) of operational amplifier 22 is coupled to the node formed between the serial coupled coils of electromagnets $L_1$, $L_2$. The non-inverting port (+) of operational amplifier 24 is coupled to the node formed between the serial coupled coils of electromagnets $L_1$, $L_2$, while the inverting port (−) of operational amplifier 24 is coupled with one lead of the coil of electromagnet $L_2$ to the second output port of amplifier 20. The output voltages from operational amplifiers 22, 24 are respectively separately rectified by absolute value stages 26, 28, and respectively applied to the non-inverting port (+) and inverting port (−) of operational amplifier 30. In turn, operational amplifier 30 provides an output voltage $V_o$ varying with the absolute values provided by rectifiers 26, 28. With this configuration, the electromagnets may be used to control the force on the shaft as well as to detect the position of shaft 10. This circuit eliminates the need for either discrete or separate position sensors.

The operation may be explained as follows. The inductance of the coils will vary with shaft displacements because the inductance of each coil increased with decreasing air gap. As can be seen in FIG. 1, the coils are connected in series, their currents are equal, and their instantaneous voltage drops ($V_1$ and $V_2$) add to equal the output voltage of the amplifier $V_{amp}$.

In a particular type of switching amplifier, the output voltage $V_{amp}$ is toggled between the supply voltage $+V_s$ and its inverse $-V_s$ with a switching frequency $f_{sw}=1/t_{sw}$, where $t_{sw}$, is the period of a switching cycle. Within a cycle, the amplifier's output is $V_s$ for a time $t_{hi}$ and is $-V_s$ for a time $t_{lo}$, where $t_{sw}=t_{hi}+t_{lo}$. By varying $t_{hi}$ (and therefore $t_{lo}$), the effective (cycle-averaged) output voltage $V_{eff}$ may be varied between $-V_s$ and $+V_s$. The relationship between $t_{hi}$ and $V_{eff}$ is:

$$V_{eff}=\{2t_{hi}/(t_{sw}-1)\}V_s; \quad 0 \leq t_{hi} \leq t_{sw} \quad (1)$$

where the ratio $t_{hi}/t_{sw}$ is known as the duty factor DF. In this mode, the effective (cycle-averaged) voltage can be varied continuously between $-V_s$ and $+V_s$ by varying the duty factor between 0 and 100%. (For example, a duty factor of 50% corresponds to a cycle-averaged voltage of zero).

Figure 2:
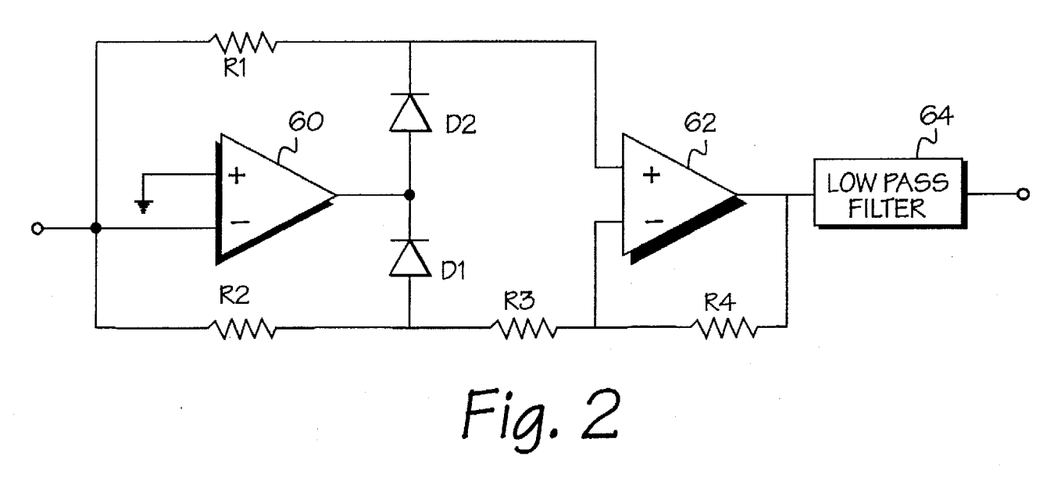
FIG. 2 is a schematic diagram illustrating an absolute value circuit suitable for use in the embodiment of FIG. 1.

A representation of the inductance of each coil (which is a function of the air gap of the coil) can be determined by measuring the voltage drops across the coils. A differential amplifier first isolates the voltage waveform across each coil. The output of the differential amplifier will resemble a square wave with an amplitude that varies with the air gap. The square waves are then applied to an absolute value circuit that provides an output that will be approximately a direct current signal. One embodiment of the absolute value circuit using high-gain amplifiers such as operational amplifiers 60, 62 is shown in FIG. 2. The direct current signals from the two coils of electromagnets L1, L2 are then subtracted to determine the position of shaft 10. In this circuit, the inverting port (−) of each operational amplifier 60 are coupled to receive the output signal from the corresponding output port of operational amplifiers 22, 24 while the non-inverting input ports are coupled to a reference potential such as a local ground. Resistor R1 is coupled between the output terminal of operational amplifier 22 and the non-inverting port (+) of operational amplifier 62 while resistors R2, R3, R4 are serially coupled between the output terminal of operational amplifier 22 and the output terminal of operational amplifier 62, with the node between resistors R3, R4 coupled to the inverting port (−) of operational amplifier 62. Diodes D1, D2 are serially coupled between the node between resistors R2, R3 and the node between resistor R1 and the non-inverting port (+) of operational amplifier 62, with the node between diodes D1, D2 coupled to the output port of operational amplifier 60. The output port of operational amplifier 62 is coupled to the input port of low pass filter 64.

Ignoring resistive voltage drops, the output voltage $V_o$ is related to the coil inductances of electromagnets $L_1$, $L_2$ by the formula:

$$V_o=[(L_1-L_2)/(L_1+L_2)] \cdot V_s$$

where $L_1$ is the inductance of the one coil and $L_2$ is the inductance of its coaxially aligned, complementary coil. Over a range of displacements, the inductance will follow an inverse gap relationship and the sum of $L_1$ and $L_2$ will be approximately constant. Equation 2 can then be approximated by:

$$V_o=(x/g)V_s \quad (3)$$

which indicates that the output will be fairly linear with displacement of shaft 10.

Figure 3:
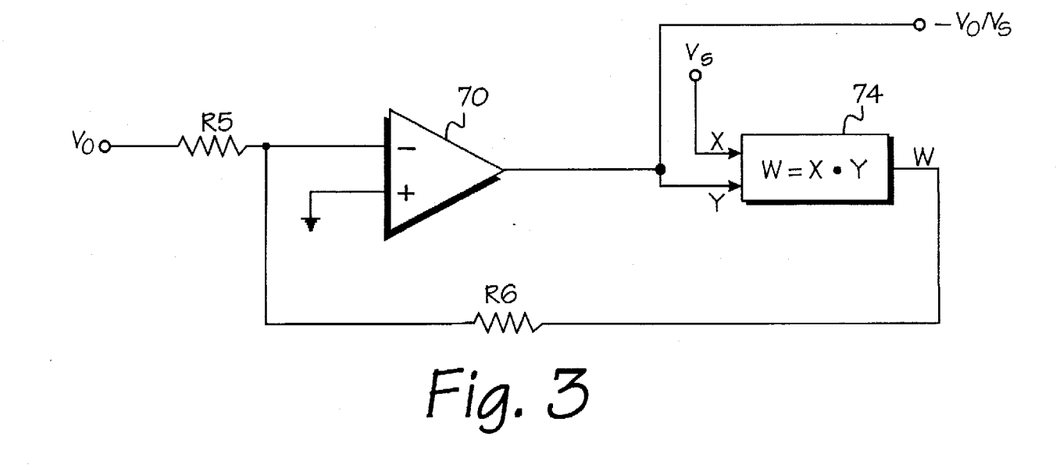
FIG. 3 is a schematic diagram illustrating a circuit for eliminating dependence of the output voltage upon the supply voltage.

It is desirable to eliminate the effect of variations in the supply voltage $V_s$ on the output of the circuit because the supply voltage may vary depending on its availability and whether it is electrically regulated. Elimination of the effect of variation in the supply voltage $V_s$ may be accomplished by normalizing the output as $V_o/V_s$. The division operation can be performed by taking the logarithm of the two signals, subtracting, and then performing an anti-log operation. Alternatively, the division can be performed using a multiplier electrical component in conjunction with a high-gain amplifier as is shown in FIG. 3. In the circuit of FIG. 3, the output voltage $V_o$ from operational amplifier 30 is applied across resistor R5 to the inverting port (−) of operational amplifier 70; the non-inverting port (+) of operational amplifier 70 is coupled to a reference potential such as a local ground. The output port from operational amplifier 70 is applied to the Y input port of a multiplier 74, while a supply voltage $V_s$ is applied to the X input port of multiplier 74. An output potential W=X.Y is applied across resistor R6 to the inverting port (−) of operational amplifier 70. The output signal provided from the output port of operational amplifier 70 is proportional to $-V_o V_s$; by applying this output signal to an additional operational amplifier, the output signal will be re-inverted. By eliminating output voltage dependence upon variations of the supply voltage $V_s$ applied to switching amplifier 20, this approach reduces the complexity of the circuit and increases its linearity. With these circuit elements, the output voltage will simply be x/g and will be independent of the supply voltage.

Figure 4:
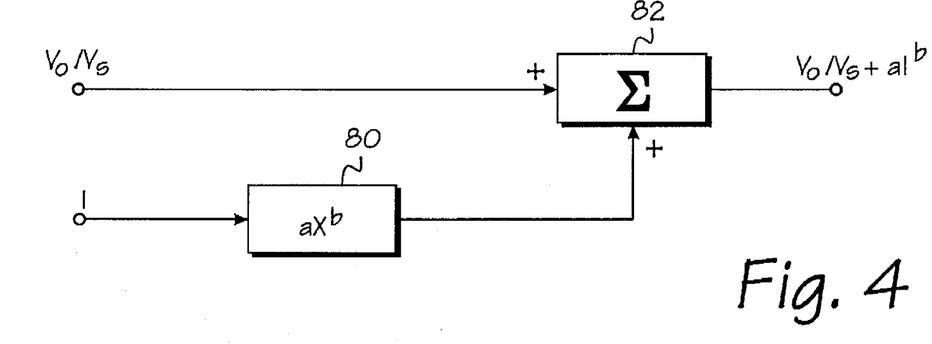
FIG. 4 is a schematic diagram illustrating a circuit for correcting for the effects of magnetic saturation.

Equation 3 can be modified to include finite permeability (including saturation) effects of the actuator iron. In one simple implementation shown in FIG. 4, a correction term proportional to the electromagnet current raised to the power b is added to $V_o/V_s$ to compensate for the reduced inductance caused by saturation effects at high current levels. This lends itself to either analog or digital implementations. In the circuit shown, the inverted output signal $V_o/V_s$ from the circuit of FIG. 3, is applied to an adder 82. The control current I is raised by stage 80 to a power b and multiplied by a coefficient a, and the output $aI^b$ is added by adder 82, to the value $V_o/V_s$. Effectively, this stage corrects for the effects of magnetic saturation.

In another scheme, the voltage $V_o/V_s$ is digitized and the correction term to x/g is found from a look-up table or other calculation which relates x to $V_o/V_s$ and I, where I is the control current.

Configuration for Independently Controlled Electromagnets

Figure 5:
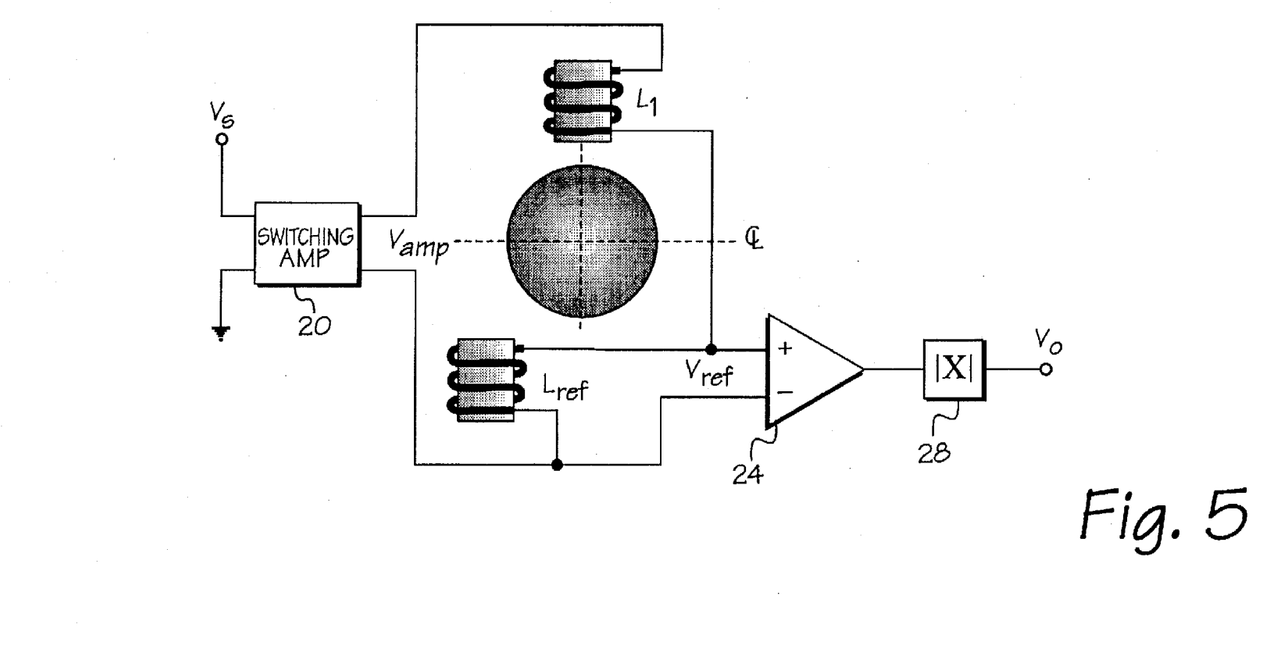
FIG. 5 is a block diagram illustrating implementation of an alternative embodiment constructed according to the principles of the present invention with one positioning coil.

The principles of the present invention can be extended to configurations in which one or more electromagnets are independently controlled, i.e., are not connected electrically in series. For this case, a reference inductance $L_{ref}$ is placed in series with the electromagnet L1. In one embodiment, this inductance is about ten percent (10%) of the inductance of the electromagnet. This allows for a high signal-to-noise ratio (since $V_s$ is substantial) without significantly degrading the slew-rate of the electromagnet due to the inductance of the reference coil.

The conceptual design for this approach is shown in FIG. 5. In this case, the output voltage is given by:

$$V_o=[L_{ref}/(L_1+L_{ref})] \times V_s \approx [L_{ref}/L_1] \times V_s$$

In this configuration, the output voltage will be less linear than in an embodiment with complementary electromagnets coupled in series because the non-linearity of the electromagnet's inductance as a function of its air gap is not cancelled by that of a complementary electromagnet.

Figure 6:
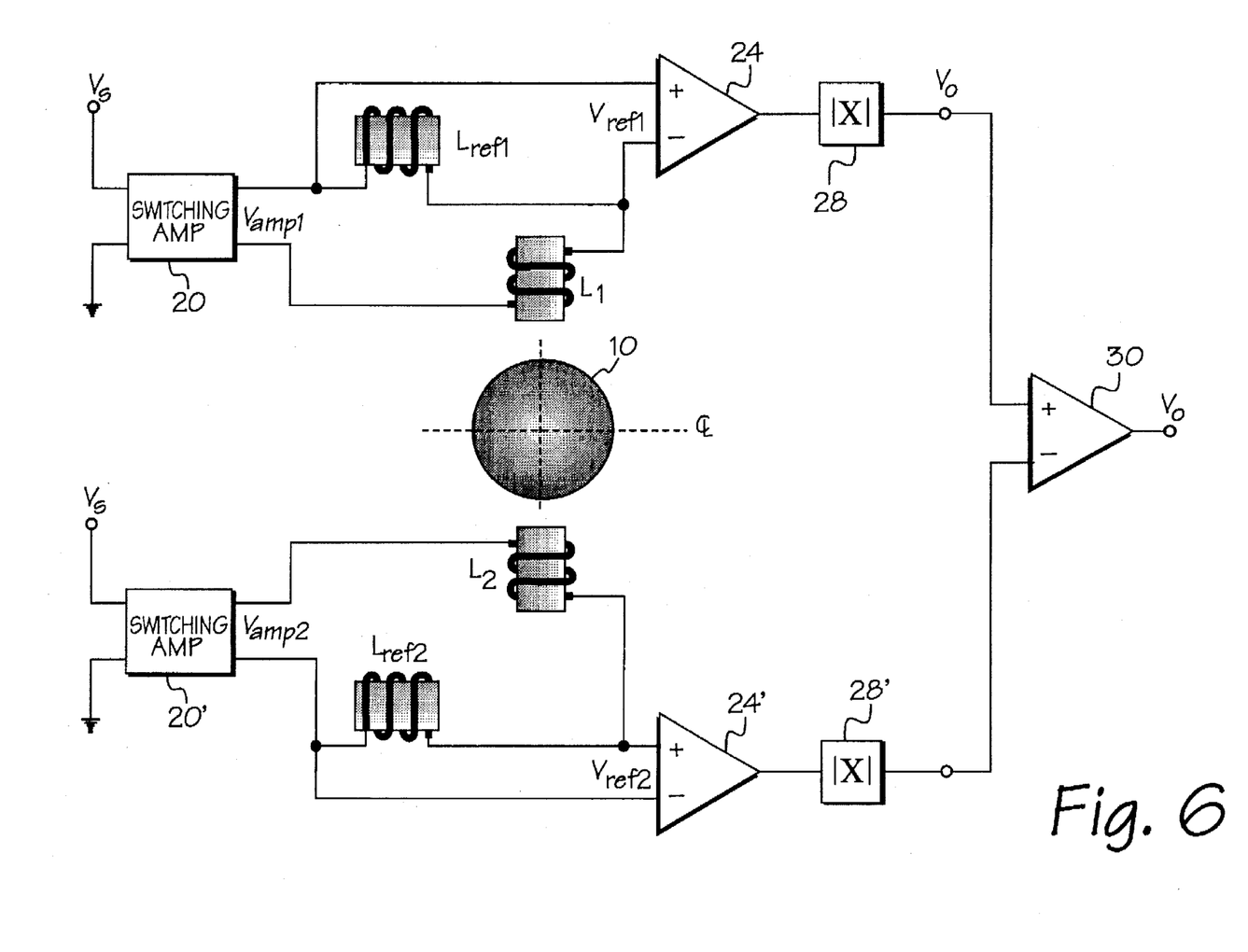
FIG. 6 is a block diagram illustrating implementation of another embodiment constructed according to the principles of the present invention using a bi-directional actuator with independently controlled electro-magnets.

Turning now to FIG. 6, the linearity can be significantly improved for the case of bi-directional actuators with separately controlled, coaxially aligned electromagnets L1, L2 however, by implementing the identical scheme for the opposing coil by employing another reference coil, and subtracting the resulting outputs. The linearity in this configuration is about the same as for complementary electromagnets connected electrically in series as shown in FIG. 1.

Figure 7:
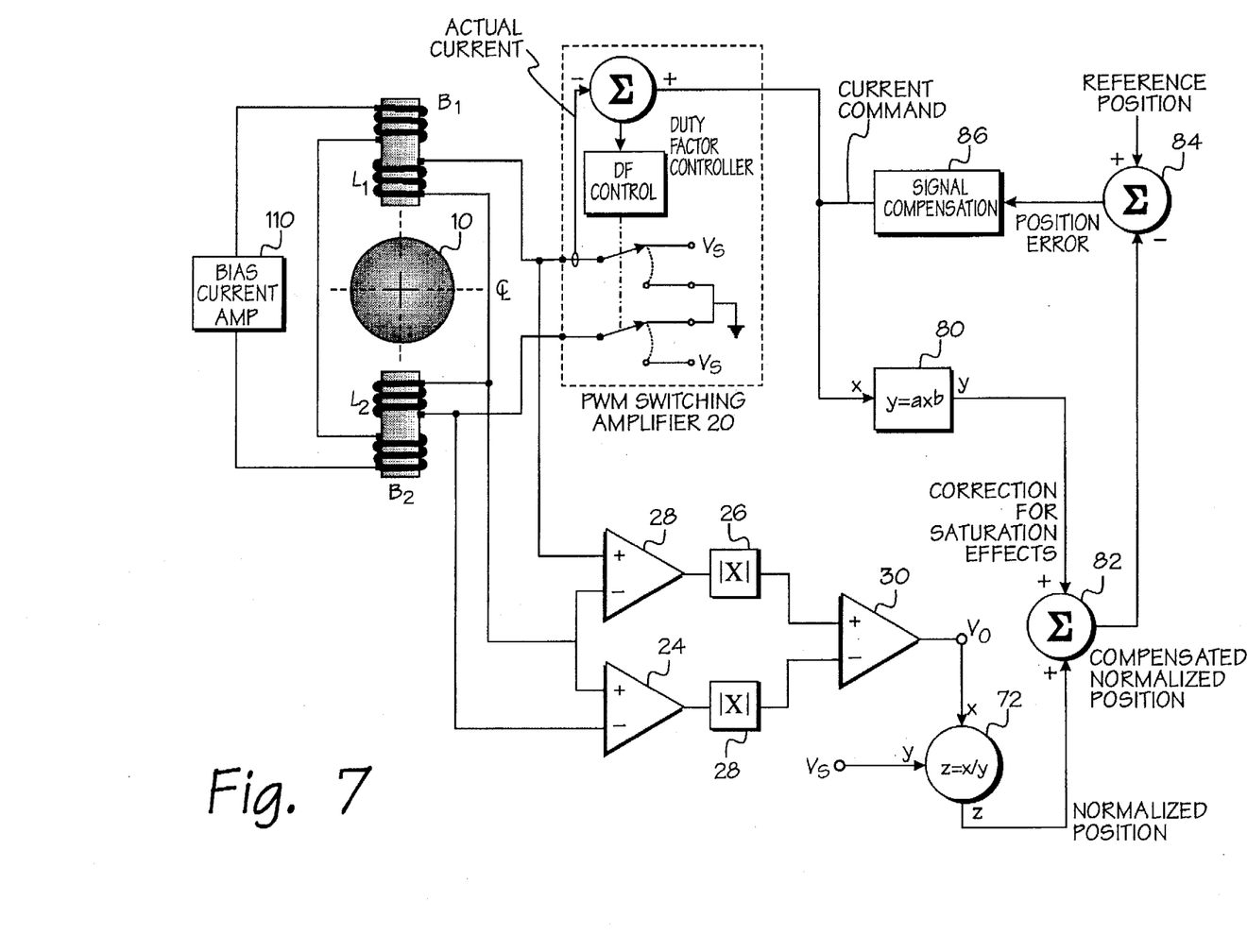
FIG. 7 is a schematic diagram of the bias circuit and the control circuit as applied to an embodiment constructed according to the principles of the present invention.

FIG. 7 shows a bias current amplifier 110 providing a bias current through serially coupled bias coil windings $B_1$, $B_2$ respectively wound around electromagnets $L_1$, $L_2$ coaxially aligned on radially opposite sides of the centerline ₵ of shaft 10. The output voltage $V_o$ provided by operational amplifier 30 is representative of the raw position of shaft 10 relative to electromagnets $L_1$, $L_2$, and is provided as the x input of multiplier 72; the supply voltage $V_s$ is applied to the y input port of multiplier 72. The z, output port of multiplier 72 provides a signal indicative of the position of shaft 10 relative to electromagnets $L_1$, $L_2$:

$$V_z = V_o/V_s \qquad (5)$$

In effect, $V_z$ is a normalized position of shaft 10 relative to electromagnets $L_1$, $L_2$. The normalized position signal is applied to one input port of adder 82. The control current command I is applied to the x port of stage 80 to provide the signal $aI^b$ corrected for effects of magnetic saturation to the second input port of adder 82. Adder 82 provides an output signal compensated for effects of magnetic saturation and normalized relative to the supply voltage $V_s$ to be subtracted by adder 84 from a signal set to a value representative of a reference position that is applied to one input port of a second adder 84; the resulting difference signal provided by adder 84 is indicative of the position correction. This position correction signal is subjected to signal conditioning by stage 86 to generate the current command signal.

pulse with modulation (i.e., PWM) switching amplifier 20, represented in abstract detail in FIG. 7, uses adder 88 to subtract a current sensed from the current flowing through the windings of the serially coupled positioning coils of electromagnets $L_1$, $L_2$, from the current command signal in order to thereby generate a duty factor control signal applied to control the duty factor of the pulse width modulation provided by pulse width modulation switching amplifier 20. Amplifier 20 toggles between application of opposite polarities of the supply voltage $V_s$ based upon the current duty factor, thereby continually endeavoring return to a horizontal radial transversing the centerline of shaft 10 to a position equidistant between the closest poles of electromagnets $L_1$, $L_2$ (assuming that the reference position signal applied to the addend port of adder 84 is set to indicate an equidistant spacing).

It should be understood that for a typical application of the foregoing principles, a plurality of circuits such as, for example, that represented by FIG. 7, are employed and are in simultaneous operation. Moreover, regardless of whether shaft 10 is rotating or is subjected to axially reciprocation, the current through the positioning coils of the electromagnets positioned about shaft 10 is controlled to continually compensate for changes in the position of shaft 10 as, for example, due to loads irregularly applied to shaft 10 during operation.

Although radial magnetic bearing configurations were used to illustrate the operation of the sensorless detection circuitry, the foregoing principles may be practiced in alternative configurations for thrust bearings and other magnetic positioners. In an embodiment of a thrust bearing, the electromagnets would impart a force on the face of a disk mounted on a shaft so that an axial force is effected. The electromagnets may also impart a force for example on a diaphragm of a diaphragm compressor or expander, on a piston, on a sealing face, or on a rod of a vibration isolator. For each of these applications, the member may be actively positioned using the position signal obtained from the circuits described herein.

What is claimed is:

1. An electromagnetic device, comprising:
   a first switching amplifier having output terminals providing a pulse modulated potential difference;
   a first electromagnet comprising a first electrically conducting coil, exhibiting a first radial axis positionable to intersect a mass to be supported with a force created by a current flowing through said first electrically conducting coil attributable to said potential difference;
   a second electromagnet comprising a second electrically conducting coil serially coupled to said first electrically conducting coil, with said first electrically conducting coil and said second electrically conducting coil coupled in series across said output terminals of said first switching amplifier;
   first means coupled across said second electrically conducting coil, for detecting inductance of said second electrically conducting coil; and
   said first switching amplifier modulating pulse widths of said pulse modulated potential difference, in dependence upon detected values of said inductance of said second electrically conducting coil detected by said first means.

2. The device of claim 1, further comprised of said second electromagnet exhibiting a second radial axis positionable to intersect the mass to be supported, with said second radial axis coaxially aligned with said first radial axis.

3. The device of claim 1, further comprised of:
   a second switching amplifier having output terminals providing a second pulse modulated potential difference;
   a third electromagnet comprising a third electrically conducting coil, exhibiting a second radial axis positionable to intersect the mass to be supported, with said second radial axis coaxially aligned with said first radial axis;
   a fourth electromagnet comprising a fourth electrically conducting coil serially coupled to said third electrically conducting coil, with said third electrically conducting coil and said fourth electrically conducting coil coupled in series across said output terminals of said second switching amplifier; and
   second means coupled across said fourth electrically conducting coil, for detecting inductance of said fourth electrically conducting coil.

4. The device of claim 3, further comprised of:
   said first switching amplifier providing said potential difference modulated as a function of said inductance detected by said first means; and
   said second switching amplifier providing said potential difference modulated as a function of said inductance detected by said second means.

5. The device of claim 3, comprising:
   inductance of said fast electrically conducting coil being substantially greater than said inductance of said second electrically conducting coil; and
   inductance of said third electrically conducting coil being substantially greater than said inductance of said fourth electrically conducting coil.

6. The device of claim 3, further comprised of said second switching amplifier providing said first potential difference modulated as a function of said inductance detected by said first means.

7. The device of claim 1, comprising inductance of said first electrically conducting coil being substantially greater than said inductance of said second electrically conducting coil.

8. An electromagnetic device, comprising:
- a first switching amplifier having output terminals providing a first pulse modulated potential difference;
- a first electromagnet comprising a first electrically conducting coil, exhibiting a first radial axis positionable to intersect a mass to be supported with a force created by electrical current flowing through said first electrically conducting coil attributable to said first potential difference;
- a second electromagnet comprising a second electrically conducting coil serially coupled to said first electrically conducting coil, with said first electrically conducting coil and said second electrically conducting coil coupled in series across said first potential difference; and
- a first operational amplifier having a pair of input ports coupled across said second electrically conducting coil and an output port providing a first output signal influencing a duty factor of said first pulse modulated potential difference in dependence upon a voltage drop occurring across said second electrically conducting coil.

9. The device of claim 8, further comprised of said second electromagnet exhibiting a second radial axis positionable to intersect the mass to be supported, with said second radial axis coaxially aligned with said first radial axis.

10. The device of claim 8, further comprised of:
- a second switching amplifier having output terminals providing a second pulse modulated potential difference;
- a third electromagnet comprising a third electrically conducting coil, exhibiting a second radial axis positionable to intersect the mass to be supported, with said second radial axis coaxially aligned with said first radial axis;
- a fourth electromagnet comprising a fourth electrically conducting coil serially coupled to said third electrically conducting coil, with said third electrically conducting coil and said fourth electrically conducting coil coupled in series across said output terminals of said second switching amplifier; and
- a second operational amplifier having a pair of input ports coupled across said fourth electrically conducting coil.

11. The device of claim 6, further comprised of:
- said first switching amplifier providing said first potential difference modulated as a function of said first output signal generated by said first operational amplifier in response to a first electrical potential occurring across said pair of input ports of said first operational amplifier; and
- said second switching amplifier providing said second potential difference modulated as a function of a second output signal generated by said second operational amplifier in response to a second electrical potential occurring across said pair of input ports of said second operational amplifier.

12. The device of claims 8, further comprised of said first switching amplifier providing said potential difference modulated as a function of said first output signal generated by said first operational amplifier in response to an electrical potential occurring across said pair of input ports.

13. A electromagnetic device, comprising:
- a first electromagnet comprising a first electrically conducting control coil, said first electromagnet exhibiting a first magnetic pole positionable to interact with a mass of ferromagnetic material to be supported by said device within a bore defined by said first electromagnet with a force created by an electrical current flowing through said first control coil;
- a second electromagnet comprising a second electrically conducting control coil serially coupled to said first control coil;
- first sensing means electrically coupled across a first one of said first and second control coils, for providing a first position signal indicative of a position of the mass relative to said first electromagnet with said control signal varying as a function of inductance of said first one of said first and second control coils; and
- switching means for applying a pulse modulated potential difference across said first and second control coils, with a duty factor of said pulse modulated potential difference varying in dependence upon a control signal based upon said first position signal.

14. The electromagnetic device of claim 13, comprising:
- means for generating said control signal by modifying said first position signal in dependence upon a reference signal defining an equilibrium location of the mass within said bore; and
- said switching means applying said pulse modulated potential difference across said first and said second control coils, with a duty cycle of opposite polarities of said pulse modulated potential difference varying in dependence upon said control signal.

15. The electromagnetic device of claim 13, comprising:
- said second electromagnet exhibiting a second magnetic pole with said second magnetic pole being positioned diametrically opposite across said bore from said first magnetic pole; and
- said second magnetic pole being separated by the mass from said first magnetic pole.

16. The electromagnetic device of claim 13, comprising:
- said first sensing means having input ports electrically coupled across said second control coil, generating said position signal on a basis of voltage drop across said second control coil.

17. The electromagnetic device of claim 13, comprising:
- said second electromagnet exhibiting a second magnetic pole, positionable to interact with the mass and cooperating with said first electromagnet to define said bore;
- second sensing means electrically coupled across a second one of said first and second control coils, for providing a second position signal indicative of said position of the mass within said bore; and
- said switching means applying said pulse modulated potential difference with said duty factor varying in dependence upon said control signal and with said control signal based upon said first position signal and said second position signal.

18. The electromagnetic device of claim 13, comprising:
- second sensing means electrically coupled across a second one of said first and second control coils, for providing a second position signal indicative of said position of the mass within said bore;
- comparator means for generating a third position signal based upon a comparison between said first position signal and said second position signal;

said switching means applying said pulse modulated potential difference with said duty factor varying in dependence upon said control signal and with said control signal being representative of said third position signal.

19. The electromagnetic device of claim 18, comprising:

said second electromagnet exhibiting a second magnetic pole with said second magnetic pole being positioned diametrically opposite across said bore from said first magnetic pole; and said second magnetic pole being separated by the mass from said first magnetic pole.

20. The electromagnet device of claim 7, comprising:

a third electromagnet comprising a third electrically conducting control coil, said third electromagnet exhibiting a second magnetic pole positioned diametrically opposite from said first magnetic pole and separated by said bore from said first magnetic pole, to interact with the mass within said bore;

a fourth electromagnet comprising a fourth electrically conducting control coil, serially coupled to said third control coil;

second sensing means electrically coupled across a first one of said third and fourth control coils, for providing a second position signal indicative of said position relative to said third electromagnet; and said switching means applying said pulse modulated potential difference with said control signal based upon said first position signal and said second position signal.

21. The device of claim 13, further comprised of said switching means providing said potential difference modulated as a function of said inductance detected by said first sensing means.

22. An electromagnetic device, comprising:

first electromagnetic means comprising a first electrically conducting coil disposed in proximity to a longitudinal axis, for converting electrical energy into a first force extending along a first axis toward a mass of magnetically responsive material positioned to exhibit movement relative to said longitudinal axis in response to said first force;

means for providing said electrical energy to said first electromagnetic means;

first means for sensing changes in an electrical characteristic of said first electromagnetic means attributable to said movement;

second electromagnetic means comprising a second electrically conducting coil positioned across said longitudinal axis from said first electromagnetic means and separated from said first electromagnetic means by the mass, said second electrically conducting coil being coupled in an electrical serial combination with said first electrically conducting coil across said means providing said electrical energy, for converting said electrical energy into a second force extending along a second axis toward the mass; and controlling means for varying modulation of said electrical energy in dependence upon said changes sensed by said first sensing means.

23. The device of claim 22, comprising:

said first sensing means being coupled across said electrically conducting coil and providing an output signal indicative of variation of inductance within said serial combination; and said controlling means varying said electrical energy in dependence upon said variation of inductance.

24. The device of claim 22, comprising:

second means for sensing changes in said electrical characteristic of said second electromagnetic means attributable to said movement; and said controlling means varying said electrical energy in dependence upon said changes sensed by said first sensing means and said changes sensed by said second sensing means.

25. The device of claim 22, comprising said first axis being substantially coaxial with said second axis.

26. An electromagnetic device, comprising:

a first switching amplifier having output terminals providing a pulse modulated potential difference;

a first electromagnet comprising a first electrically conducting coil, exhibiting a first radial axis positionable to intersect a mass to be supported by a force created by a current flowing through said first electromagnetic coil caused by said modulated potential difference;

a second electromagnet comprising a second electrically conducting coil serially coupled to said first electrically conducting coil, with said first electrically conducting coil and said second electrically conducting coil being coupled in series across said output terminals of said first switching amplifier; and first means coupled across said second electrically conducting coil, for detecting inductance of said second electrically conducting coil and for controlling modulation of said potential difference by said switching amplifier in dependence upon values of said inductance of said second electrically conducting coil detected by said first means.

27. The device of claim 26, further comprised of said second electromagnet exhibiting a second radial axis positionable to intersect the mass to be supported, with said second radial axis coaxially aligned with said first longitudinal axis.

28. The device of claim 26, further comprised of:

a second switching amplifier having output terminals providing said pulse modulated potential difference;

a third electromagnet comprising a third electrically conducting coil, exhibiting a second radial axis positionable to intersect the mass to be supported by a force created by a current flowing through said third electrically conducting coil caused by said modulated potential difference, with said second radial axis being coaxially aligned with said first radial axis;

a fourth electromagnet comprising a fourth electrically conducting coil serially coupled to said third electrically conducting coil, with said third electrically conducting coil and said fourth electrically conducting coil coupled in series across said output terminals of said second switching amplifier; and second means coupled across said fourth electrically conducting coil, for detecting inductance of said fourth electrically conducting coil and for controlling modulation of said potential difference in dependence upon detected said inductance of said fourth electrically conducting coil.

29. An electromagnetic device, comprising:

a first switching amplifier having output terminals providing a pulse modulated potential difference;

a first electromagnet comprising a first core and a first electrically conducting coil wound around said first core, with said first electrically conducting coil exhibiting a first radial axis positionable to intersect a mass to be supported by a force created by a current flowing through said first electromagnetic coil caused by said modulated potential difference;

a source of electrical current;

a first bias coil coaxially wound around said first core in coaxially alignment with said first electrically conducting coil to conduct said electrical current;

a second electromagnet comprising a second core and a second electrically conducting coil wound around said second core, with said second electrically conducting coil serially coupled to said first electrically conducting coil, said first electrically conducting coil and said second electrically conducting coil being coupled in series across said output terminals of said first switching amplifier;

a second bias coil coaxially wound around said second core in coaxially alignment with said second electrically conducting coil to conduct said electrical current; and first means coupled across said second electrically conducting coil, for detecting inductance of said second electrically conducting coil and for controlling modulation of said potential difference by said switching amplifier in dependence upon values of said inductance of said second electrically conducting coil detected by said first means.

30. The device of claim 29, further comprised of said second electromagnet exhibiting a second radial axis positionable to intersect the mass to be supported, with said second radial axis coaxially aligned with said first radial axis.

31. The device of claim 29, further comprised of:

a second switching amplifier having output terminals providing said pulse modulated potential difference;

a third electromagnet comprising a third core and third electrically conducting coil wound around said third core, with said third electrically conducting coil exhibiting a second radial axis positionable to intersect the mass to be supported by a force created by a current flowing through said third electrically conducting coil caused by said modulated potential difference, with said second radial axis being aligned on opposite sides of the mass to be supported with said first radial axis;

a fourth electromagnet comprising a fourth core and a fourth electrically conducting coil wound around said fourth core, with said fourth electrically conducting coil being serially coupled to said third electrically conducting coil, with said third electrically conducting coil and said fourth electrically conducting coil being coupled in series across said output terminals of said second switching amplifier; and second means coupled across said fourth electrically conducting coil, for detecting inductance of said fourth electrically conducting coil and for controlling modulation of said potential difference in dependence upon said inductance of said fourth electrically conducting coil detected by said second means.

32. An electromagnetic device, comprising:

a first switching amplifier having output terminals providing a pulse modulated first potential difference;

a fast electromagnet comprising a first electrically conducting coil, exhibiting a first radial axis positionable to intersect a mass to be supported by a force created by a current flowing through said first electromagnetic coil caused by said modulated potential difference;

a second electromagnet comprising a second electrically conducting coil serially coupled to said first electrically conducting coil, with said first electrically conducting coil and said second electrically conducting coil connected in a first serial combination coupled in series across said output terminals of said first switching amplifier;

first means coupled across said second electrically conducting coil, for controlling modulation of said first potential difference by said switching amplifier in dependence upon values of inductance of said first serial combination detected by said first means;

a second switching amplifier having output terminals providing a pulse modulated second potential difference;

a third electromagnet comprising a third electrically conducting coil, exhibiting a second radial axis positionable to intersect the mass to be supported by a force created by a current flowing through said third electrically conducting coil caused by said second modulated potential difference, with said second radial axis being axially oriented in approximate diametric opposition toward said first radial axis;

a fourth electromagnet comprising a fourth electrically conducting coil serially coupled to said third electrically conducting coil, with said third electrically conducting coil and said fourth electrically conducting coil connected in a second serial combination coupled in series across said output terminals of said second switching amplifier; and second means coupled across said fourth electrically conducting coil, for controlling modulation of said second potential difference in dependence upon values of inductance of said second serial combination detected by said second means.

* * * * *